Patented Aug. 12, 1924.

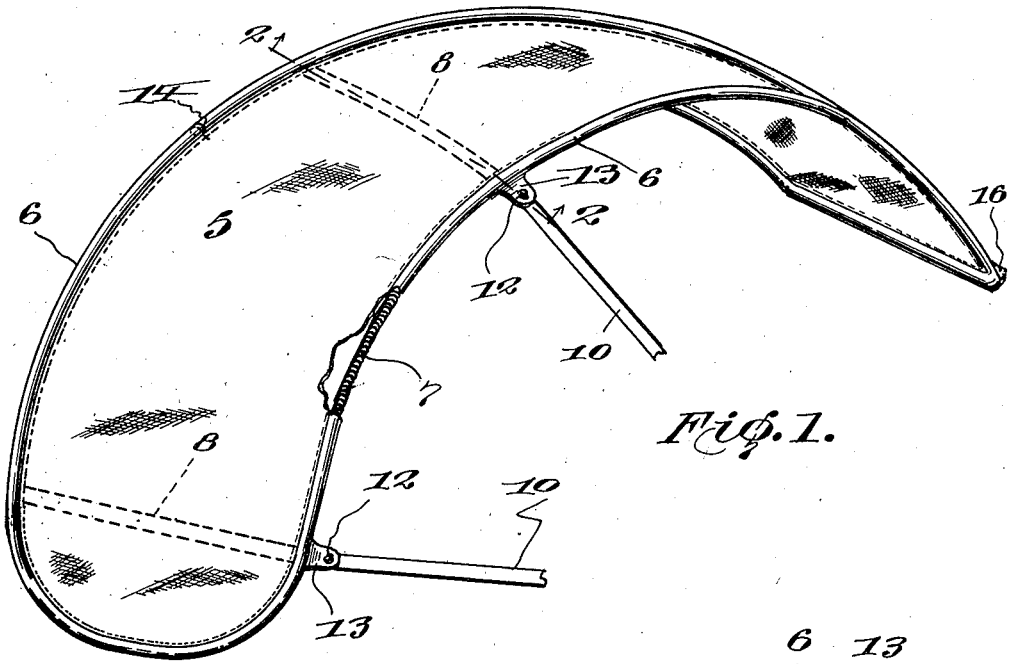

1,504,510

UNITED STATES PATENT OFFICE.

ISAAC ROSENTHAL, OF CHICAGO, ILLINOIS.

FENDER.

Application filed November 18, 1922. Serial No. 601,824.

*To all whom it may concern:*

Be it known that I, ISAAC ROSENTHAL, a citizen of the United States, residing at Chicago, in the county of Cook and State of Illinois, have invented new and useful Improvements in Fenders, of which the following is a specification.

This invention relates to fenders for automobiles and other motor vehicles, and its object is to provide a fender which is constructed of textile material held in shape by a resilient frame. A fender constructed in this manner is sufficiently strong and durable to effectually serve its purpose, and at the same time it cannot be dented as the ordinary sheet metal fender, and it is also readily washable.

With the object stated in view, the invention consists in a novel combination and arrangement of parts to be hereinafter described and claimed, and in order that the same may be better understood, reference is had to the accompanying drawing, wherein:

Figure 1 is a perspective view of the fender partly broken away; Fig. 2 is an enlarged cross-section on the line 2—2 of Fig. 1, and Fig. 3 is a plan view of the fender showing the means for attachment to the running board of the car.

In carrying out the invention, I take a sheet of heavy duck, tarpaulin or similar textile material, and cut it into the desired shape to form the body of the fender, the same being denoted in the drawing by the reference numeral 5. The edge of the sheet is made with a hem 6 which is continuous and extends entirely around the sheet, and in this hem is mounted a coil spring 7 which therefore serves as an edge reinforcement. The spring 7 also holds the sheet stretched taut so that it will maintain its shape. The desired curvature of the fender body 5 is obtained by applying to the under side of the same a number of pockets 8 and mounting in each of said pockets a coil spring 9. Two pockets and a corresponding number of springs are shown, and they extend transversely of the fender body. The pockets can be formed by strips of textile material sewed to the sheet forming the fender body.

Each spring 9, at the inner edge of the fender body, is connected to a bracket arm 10 whereby the fender is secured to the car body. The manner in which these fender-supporting arms are fastened to the car body has not been illustrated as it is immaterial to the present invention, and will depend on the design of the car body. The connection between the spring 9 and the arm 10 is made by forming the end of the spring into an eye 11 and passing through the latter and the arm a cotter pin or other suitable fastener 12. The end of the arm also extends for short distance into the convolutions of the spring so as to properly locate the eye with respect to the arm for connection thereto by the fastener 12. The inner edge of the fender body also has a flap 13 to cover the projecting end of the spring, and the fastener 12 also passes through this flap.

It will be evident from the foregoing that the fender can be readily removed for cleaning or other purposes, upon removing the fasteners 12. The marginal and cross springs 7 and 9 can also be removed if it is desired to wash the sheet forming the fender. In order that the marginal spring may be removed it will be necessary to leave an opening in the hem 6 where the ends of the spring are joined. This opening is shown at 14 in Fig. 1.

Skirts for the space between the fenders and the car body can be made of the same material as the fenders, and secured by suitable fasteners.

The end of the fender which is next to the running board 15 of the car is attached to the latter by being provided with a short extension 16 fitted with eyelets 17 to receive turn-buttons 18 on the running board. A separable fastening for the end of the fender is thus provided, and as the fender is also detachable from the rods 10 it can be entirely removed from the car. The fasteners 18 may be of that type employed in connection with automobile side curtains.

I claim:

1. A fender for motor vehicles composed of a sheet of textile material, resilient reinforcing means applied to the edge of the sheet, resilient shaping elements extending transversely of the sheet, and fender supporting-arms to which said elements are connected at the inner edge of the sheet, said sheet also having inner edge portions which are secured to the arms.

2. A fender for motor vehicles composed of a sheet of textile material, resilient reinforcing means applied to the edge of the sheet, resilient shaping elements extending transversely of the sheet, pockets on the under side of the fender in which the shaping elements are housed, and fender supporting-arms to which said elements are connected at the inner edge of the sheet, said sheet also having inner edge portions which are secured to the arms.

3. A fender for motor vehicles composed of a sheet of textile material, resilient reinforcing means applied to the edge of the sheet, said edge having a hem in which the reinforcing means is enclosed, resilient shaping elements extending transversely of the sheet, and fender supporting-arms to which said elements are connected at the inner edge of the sheet, said sheet also having inner edge portions which are secured to the arms.

4. A fender for motor vehicles composed of a sheet of textile material, resilient reinforcing means applied to the edge of the sheet, said edge having a hem in which the reinforcing means is enclosed, resilient shaping elements extending transversely of the sheet, pockets on the under side of the fender in which the shaping elements are housed, and fender supporting-arms to which said elements are connected at the inner edge of the sheet, said sheet also having inner edge portions which are secured to the arms.

5. A vehicle fender comprising a sheet of flexible material, yieldable reinforcing means secured to the edge portions of the sheet, transverse springs carried by the sheet and having their inner portions formed with eyes, the sheet of flexible material being provided with ears adjacent said eyes, attaching members, and fastening devices connecting said eyes and said ears to said attaching members.

In testimony whereof I affix my signature.

ISAAC ROSENTHAL.